(12) United States Patent
Chana et al.

(10) Patent No.: US 11,543,377 B2
(45) Date of Patent: Jan. 3, 2023

(54) SENSING APPARATUS AND SENSING METHOD

(71) Applicant: Oxford University Innovation Limited, Oxford (GB)

(72) Inventors: Kamaljit Singh Chana, Oxford (GB); Vikram Sridhar, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 264 days.

(21) Appl. No.: 16/621,710

(22) PCT Filed: Jun. 15, 2018

(86) PCT No.: PCT/GB2018/051669
§ 371 (c)(1),
(2) Date: Dec. 12, 2019

(87) PCT Pub. No.: WO2018/229509
PCT Pub. Date: Dec. 20, 2018

(65) Prior Publication Data
US 2021/0140907 A1  May 13, 2021

(30) Foreign Application Priority Data

Jun. 16, 2017 (GB) ..................... 1709639

(51) Int. Cl.
*G01N 27/18* (2006.01)
(52) U.S. Cl.
CPC ................... *G01N 27/18* (2013.01)
(58) Field of Classification Search
USPC .............. 374/43, 1, 183, 110, 112, 115
See application file for complete search history.

(56) References Cited

U.S. PATENT DOCUMENTS

| 2012/0073357 A1 | 3/2012 | Gatzmanga et al. |
| 2013/0081445 A1 | 4/2013 | De Coulon et al. |
| 2020/0264150 A1* | 8/2020 | Chana ..................... G01N 25/18 |

FOREIGN PATENT DOCUMENTS

| DE | 3741971 A1 | 6/1989 |
| EP | 0 749 013 A1 | 12/1996 |

(Continued)

OTHER PUBLICATIONS

International Search Report & Written Opinion for PCT/GB2018/051669, dated Sep. 13, 2018, pp. 1-18.

(Continued)

*Primary Examiner* — Mirellys Jagan
(74) *Attorney, Agent, or Firm* — Thomas|Horstemeyer, LLP

(57) ABSTRACT

A probe comprises a resistive element configured to be brought into thermal contact with an entity to be sensed. A measurement system applies a plurality of heating pulses to the resistive element by driving an electrical current through the resistive in element and measures an electrical response of the resistive element to the heating pulses in order to determine information about either or both of the composition and state of the entity. The measurement system generates an output signal using the measured electrical response, wherein the output signal is generated by progressively offsetting the measured electrical response such that, in the event of an average temperature of the resistive element changing between different heating pulses due to a drift in the average temperature of a portion of the entity being sensed, a variance over the plurality of heating pulses of a value of the output signal at a predetermined common reference point within each heating pulse is reduced.

22 Claims, 10 Drawing Sheets

(56) References Cited

FOREIGN PATENT DOCUMENTS

| | | |
|---|---|---|
| GB | 1 214 266 A | 12/1970 |
| JP | 2556043 B2 | 11/1996 |
| JP | 2000039413 A | 2/2000 |
| JP | 2009216405 A | 9/2009 |
| JP | 2017003441 A | 1/2017 |
| WO | 2009/009848 A1 | 1/2009 |
| WO | 2016/097723 A1 | 6/2016 |
| WO | WO-2018185008 A1 * | 10/2018 |

OTHER PUBLICATIONS

International Preliminary Report on Patentability for PCT/GB2018/051669, dated Dec. 17, 2019, pp. 1-12.
UK Search Report for GB1709639.7, dated Nov. 30, 2017, pp. 1-10.

* cited by examiner

SENSING APPARATUS AND SENSING METHOD

CROSS-REFERENCE TO RELATED APPLICATIONS

This application is the National Stage of International Application No. PCT/GB2018/051669, filed Jun. 15, 2018, which claims priority to GB 1709639.7, filed Jun. 16, 2017, which are entirely incorporated herein by reference.

FIELD OF THE INVENTION

The invention relates to sensing information about either or both of the composition (structural or chemical) and state (e.g. pressure) of an entity. The sensing is performed by measuring thermal properties of the entity, such as thermal product and quantities that depend on the thermal product. The approach may be applied to detecting contamination in liquids, such as levels and types of contamination in lubricating and cooling oils, hydraulic fluid and fuel. Contamination in cleaning liquids used in food manufacturing facilities may be detected. The composition of entities which are not liquids, such as solids or gels or multiphase materials may be detected. Pressures of fluids may be detected.

BACKGROUND TO THE INVENTION

Liquids such as lubricating and cooling oils, hydraulic fluid and fuel are regularly required to be replaced/filtered as they degrade or become contaminated, in order to avoid unnecessary damage to machines that rely on the liquids. Degradation can occur via oxidation due to exposure to high temperature, the addition of debris (metallic or non-metallic) or another fluid and/or aging of the fluid.

Continuous oil condition monitoring of machinery and lubricant testing is fast becoming the established method of predicting and avoiding impending machinery breakdown. Real time sensors that operate based on monitoring the dielectric constant of a liquid are known. The dielectric constant is a measure of the ability of a fluid to resist an electrical field. These sensors work well in detecting water contamination as oil and water have very different dielectric values. A major drawback is that they are temperature dependant. Other known sensors operate based on various optical techniques, such as infrared spectrometry or particle sizing. Inductive coil magnetometry systems have also been deployed where ferrous and non-ferrous particles are identified and quantified. This approach is advantageous in that it makes it possible to track the progress of debris contamination. In-line X-ray fluorescence spectroscopy is being developed for use in sensors. Capacitive sensors have also been developed where water saturation can be detected.

Detection of the composition of samples which are not liquids can require expensive, time-consuming and/or destructive analysis techniques. For example, X-rays can be used to analyse the internal structure of objects. However, X-ray equipment can be expensive and bulky. Objects can be broken up to see the internal structure but this may involve irreversible damage to the object. Objects having a complex chemical structure may be broken up and chemical analysis techniques may be used to determine the chemical composition. The chemical analyses may take considerable time and are expensive to perform.

WO 2016/097723 A1 discloses apparatus and methods for detecting compositional information based on thermal measurements. The disclosed approach provides a low cost alternative to the methods discussed above that is less sensitive to temperature variations. It would be desirable however to improve accuracy, measurement speed and/or hardware requirements.

According to an aspect of the invention, there is provided a sensing apparatus, comprising: a probe comprising a resistive element configured to be brought into thermal contact with an entity to be sensed; a measurement system configured to apply a plurality of heating pulses to the resistive element by driving an electrical current through the resistive element and to measure an electrical response of the resistive element to the heating pulses in order to determine information about either or both of the composition and state of the entity, wherein the measurement system is configured to generate an output signal using the measured electrical response, wherein the output signal is generated by progressively offsetting the measured electrical response such that, in the event of an average temperature of the resistive element changing between different heating pulses due to a drift in the average temperature of a portion of the entity being sensed, a variance over the plurality of heating pulses of a value of the output signal at a predetermined common reference point within each heating pulse is reduced.

SUMMARY OF THE INVENTION

The apparatus provides a sensitive and widely applicable mode for obtaining compositional information about materials based on their thermal properties, for example the thermal product ($\sqrt{\rho c \kappa}$). The apparatus may be adapted to detect the composition of any phase of matter, including solids, liquids, gases, gels and mixtures of any of these phases or other phases. In an embodiment the apparatus is capable of detecting a chemical composition of a sample and/or comparing the chemical composition of one sample with the chemical composition of another sample. The apparatus may be used for quality control purposes by detecting differences in chemical composition between nominally identical objects. In an embodiment the apparatus is capable of detecting a structural composition of a sample and/or comparing the structural composition of one sample with the structural composition of another sample. For example the apparatus may be arranged to detect unwanted defects, inclusions or voids in a manufactured object, such as an object formed from a cast. The apparatus may be used for quality control purposes by detecting differences in structural composition between nominally identical manufactured objects.

The offsetting of the output signal allows drifts in an average temperature of the resistive element to be compensated, thereby providing high reliability and accuracy without requiring complex hardware or post-measurement processing. Memory requirements are minimized. The offsetting makes it possible for a single value of the output signal (e.g. a value corresponding to the end of each heating pulse) to be representative of the compositional information and/or state of the entity without any further processing (e.g. comparison with earlier values of the output signal in the heating pulse) being necessary.

The offsetting makes it possible for the apparatus to be used effectively even in situations where the overall temperature of the entity being sensed varies significantly. This may be useful for example when the apparatus is used to monitor lubricant (e.g. oil) condition in an engine that is not running in a steady state, for example in a period while the engine is warming up shortly after starting of the engine.

In an embodiment, the offsetting of the output signal comprises applying an individual offset to each portion of the output signal corresponding to one heating pulse, optionally in real time. This approach can be implemented using relatively simple hardware at low cost. In an embodiment, the offsetting is implemented exclusively in hardware. Noise is reduced because signal transmission to and/or from separate processing devices is minimized.

In an embodiment, a processing unit processes a history of the offsetting to determine a variation of the average temperature of the resistive element over the plurality of heating pulses and thereby a variation in the average temperature of a portion of the entity being sensed. The determined variation of the average temperature may be used to improve the determination of the information about the entity, by taking account of temperature induced changes in one or more of the density, heat capacity and thermal conductivity of a portion of the entity being sensed by the heating pulses. Alternatively or additionally, the processing unit may derive a pressure of the entity being sensed by using the determined variation of the average temperature to deduce a temperature of the fluid, using the deduced temperature of the fluid to obtain information about the heat capacity and thermal conductivity of the fluid (e.g. values of each of the heat capacity and thermal conductivity or a value of the product of the heat capacity and the thermal conductivity) from predetermined information about the expected temperature dependence of the heat capacity and thermal conductivity of the fluid, and using the obtained information about the heat capacity and the thermal conductivity to obtain the pressure using heat transfer characteristics derived from the electrical response of the resistive element to the heating pulses.

In an embodiment the resistive element is mounted on a substrate in such a way that at least 10% of the surface area of the resistive element is in contact with the substrate (e.g. as a thin film element mounted on a substrate). An advantage of this arrangement is that significant heating power can be applied to the resistive element without the resistive element reaching temperatures which are high enough to potentially damage the sample (e.g. liquid) being monitored. The substrate acts to conduct heat effectively away from the resistive element.

According to an aspect of the invention, there is provided a sensing method, comprising: bringing a resistive element into thermal contact with an entity to be sensed; determining information about either or both of the composition and state of the entity by applying a plurality of heating pulses to the resistive element by driving an electrical current through the resistive element and measuring an electrical response of the resistive element to the heating pulses, wherein an output signal is generated using the measured electrical response, and the output signal is generated by progressively offsetting the measured electrical response such that, in the event of an average temperature of the resistive element changing between different heating pulses due to a drift in the average temperature of a portion of the entity being sensed, a variance over the plurality of heating pulses of a value of the output signal at a predetermined common reference point within each heating pulse is reduced.

According to an aspect of the invention, there is provided a sensing apparatus, comprising: a first resistive element; a second resistive element; and a measurement system, wherein: the first resistive element and the second resistive element are configured to be brought simultaneously into contact with an entity to be sensed; and the measurement system is configured to: apply a first heating to the entity via the first resistive element and measure a first electrical response of the first resistive element to the first heating; apply a second heating to the entity via the second resistive element and measure a second electrical response of the second resistive element to the second heating; and detect a level of contamination in the entity by comparing the measured first electrical response and the measured second electrical response.

The first and second resistive elements are affected in a correlated manner by changes in the temperature of the entity being sensed, which allows differences in the environment adjacent to each resistive element to be detected with high sensitivity using a comparison between outputs from the resistive elements (for example a difference between them). This approach is particularly applicable to detecting contamination in the entity, for example particulate contamination in a liquid entity being sensed, such as a lubricating or coolant liquid in an engine. In an embodiment, the sensitivity is enhanced by providing apparatus that favours deposition of contamination on the first resistive element relative to the second resistive element. In an embodiment, this is achieved using a magnetic field applying unit configured to apply a magnetic field effective to attract magnetic contaminant particles in the entity towards the first resistive element to a greater extent than towards the second resistive element. In another embodiment, there is provided a deposition inhibiting device configured to inhibit deposition of contaminant particles on the second resistive element relative to the first resistive element (e.g. a filter).

In an embodiment, the first resistive element and second resistive element provide an extra channel of information. An output from the first resistive element or the second resistive element individually, optionally compensated for temperature drift using the progressive offsetting described above, allows information to be obtained about a state of an entity being sensed other than a level of contamination (particularly particulate contamination), including for example a level of degradation or chemical breakdown (e.g. oxidation). Using a comparison between measurements obtained using both of the first resistive element and the second resistive element allows information about contamination to be detected. Thus, degradation and contamination can be measured separately from each other using the same group of resistive elements.

According to an aspect of the invention, there is provided a sensing method, comprising: bringing a first resistive element and a second resistive element simultaneously into thermal contact with an entity to be sensed; applying a first heating to the entity via the first resistive element and measuring a first electrical response of the first resistive element to the first heating; applying a second heating to the entity via the second resistive element and measuring a second electrical response of the second resistive element to the second heating; and detecting a level of contamination in the entity by comparing the measured first electrical response and the measured second electrical response.

BRIEF DESCRIPTION OF THE DRAWINGS

Embodiments of the invention will now be described, by way of example only, with reference to the accompanying drawings in which corresponding reference symbols indicate corresponding parts, and in which.

DETAILED DESCRIPTION

The present inventors have recognised that the heat transfer characteristics of materials (e.g. thermal conductivity, κ, specific heat capacity, c, and quantities that depend on one or both of these properties) can depend sensitively on the composition (e.g. chemical or structural) of the materials. The thermal product, $\sqrt{\rho c \kappa}$, where $\rho$ is equal to the density, is often a heat transfer characteristic that is particularly sensitive to composition because it takes into account both κ and c. Changes in either or both of K and c will typically result in a change in $\sqrt{\rho c \kappa}$. Changes in relative concentrations of different components in a multi-component material can be detected particularly efficiently where the different components have very different thermal properties. For example, metallic or magnetic (e.g. ferrous) particles in water or human or animal tissue can be detected sensitively due to the fundamentally different thermal properties. At a temperature of 60° C., for example, the thermal conductivity of water is about 0.580 $Wm^{-1}K^{-1}$ compared to over 300 W/mK for metals such as gold, silver and copper.

The effect of the composition on the heat transfer characteristics of a material may not be derivable simply by summing the individual heat transfer characteristics of the components of the material. This is because multi-phase compositions may be present having complex thermal properties. However, for many compositions there will, overall, be a distinct correlation between the heat transfer characteristics and the composition that enables any changes in the composition (or differences relative to a reference) to be detected via measurements of the thermal properties.

The inventors have recognised that detecting heat transfer characteristics of materials over time can provide a simple, effective and reliable way to detect changes in the composition of the materials.

Figure 1:
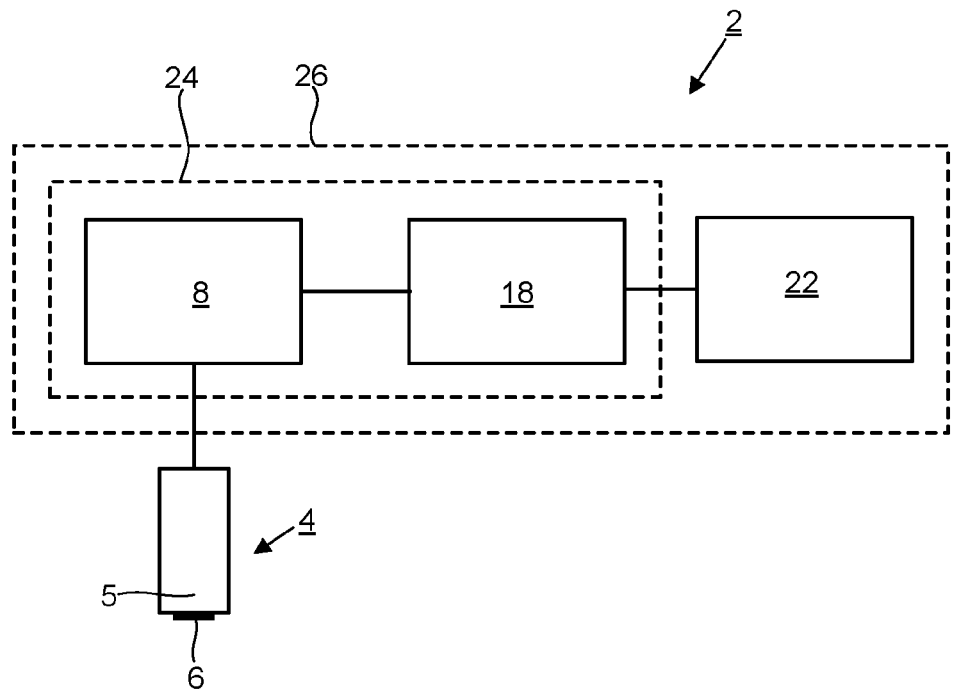
FIG. 1 schematically depicts an example sensing apparatus.

In an embodiment, an example of which is depicted in FIG. 1, a sensing apparatus 2 based on the above principles is provided. The apparatus 2 comprises a probe 4. The probe 4 comprises a resistive element 6. The resistive element 6 is configured so that it can be in thermal contact with an entity to be sensed in use.

In various embodiments the resistive element 6 is metallic. In these embodiments, the resistive element 6 may be configured such that the thermal contact between the resistive element 6 and the entity to be sensed will not result in a significant reduction in the electrical resistance between one end of the resistive element 6 and the other end of the resistive element 6. This may be achieved by arranging for the resistivity of the resistive element 6 to be much lower than the resistivity of the entity to be sensed or by positioning a thin layer of electrically insulating material between the resistive element 6 and the entity to be sensed.

In an embodiment the resistive element 6 is mounted on a substrate 5 in such a way that at least 10% of the surface area of the resistive element 6 is in contact with the substrate 5, optionally via a support material encapsulating the resistive element 6 (e.g. a thin film of electrically insulating material), optionally more than 30%, optionally around 50%. In an embodiment the resistive element 6 is a thin film resistive element (e.g. thin film resistance thermometer). In an embodiment the resistive element 6 comprises a thin film of platinum mounted on a substrate 5.

In an embodiment the resistive element 6 is a thin film resistive element having a first surface (lower surface in FIG. 1) that faces towards the entity to be sensed and a second surface (upper surface in FIG. 1) that faces towards the substrate 5. It is understood that the first and second surfaces are the large surfaces of the thin film (and do not include any of the very thin side surfaces). In an embodiment no portion of the entity being sensed is present between the second surface and the substrate 5.

The presence of the substrate 5 allows relatively large currents to be applied to the resistive element 6 without the resistive element 6 overheating, which could damage the resistive element 6 and/or material that is in contact with the resistive element 6.

Figure 5:
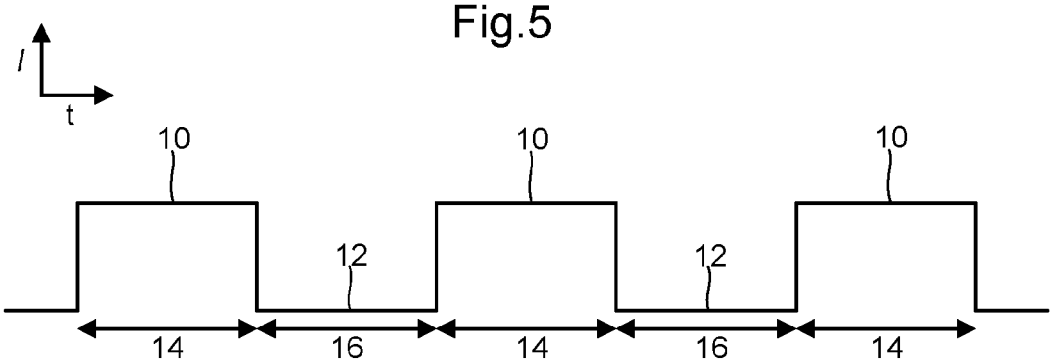
FIG. 5 is a graph depicting a variation of an applied current I against time defining a plurality of heating pulses.

A measurement system 8 is connected to the probe 4. The measurement system 8 applies a plurality of heating pulses 10 to the resistive element 6, as illustrated in FIG. 5. Each heating pulse 10 is applied by driving an electrical current/through the resistive element 6. In the example of FIG. 5, top-hat shaped pulses are applied, but other pulse shapes could be used if desired. In an embodiment, the plurality of heating pulses 10 each have the same duration 14 (as shown in FIG. 5). The heating pulses 10 are regularly spaced apart from each other (i.e. the spacing between each pair of heating pulses 10 is the same). The duration of each heating pulse 10 is equal to or less than the separation 16 between the heating pulses 10. This provides time for the resistive element 6 to cool between each heating pulse 10. In the example of FIG. 1, the separation 16 between heating pulses 10 is the same as the duration 14 of each heating pulse 10. This provides a minimum time for the resistive element 10 to cool between heating pulses, thereby allowing a high measurement sampling rate and, as a consequence, high accuracy (by averaging) and/or time resolution.

The measurement system 8 measures an electrical response of the resistive element 6 to the heating pulses, for example by measuring a voltage dependent on the resistance of the resistive element 6 and the current being driven through the resistive element 6. The resistance of the resistive element 6 varies as a function of the temperature of the resistive element. Measuring the electrical response of the resistive element 6 thus corresponds to measuring a temperature response of the resistive element 6.

The electrical response of the resistive element 6 to the heating pulses 10 can be used to determine compositional information of the entity. This is because the variation in the temperature of the resistive element 6 with time will depend on the heat transfer characteristics of materials adjacent to the resistive element 6 and can be used to derive values of measures of heat transfer characteristics such as thermal product. The heat transfer characteristics determine how efficiently heat will be conducted away from the resistive element 6. The heat transfer characteristics will depend on the chemical and/or structural composition of the materials. The measurement of the electrical response therefore provides information about the chemical and/or structural composition of material adjacent to the resistive element 6 (in thermal contact therewith). If the chemical and/or structural composition of the material is known, or at least the temperature dependence of thermal properties such as the heat capacity and the thermal conductivity (or a combination thereof), the measurement of the electrical response can be used to deduce density and thereby pressure, due to the dependence of the thermal product on density.

In an embodiment, a response to the heating pulse is compared with the response to a corresponding heating pulse applied to a reference material. The size of the response, the variation of the response as a function of time, or various other aspects of the response may be considered. Any deviation from the response measured for the reference material may be used to determine a change in the composition of the entity, including a change in the chemical or structural composition of the entity. The nature of the heating pulses may be selected to achieve optimum sensitivity for the particular entity being measured. This may involve selecting particular pulse shapes, amplitudes, durations and/or repetition rates, for example.

A processing unit 18 is provided to analyse an output signal provided by the measurement system 8 to determine the compositional information about the entity being sensed. The measurement system 8 and processing unit 18 may or may not be provided as separate units. In an embodiment the measurement system 8 and processing unit 18 are provided in a combined measurement/processing unit 24 (as shown schematically by a broken line box in FIG. 1). In an embodiment a handheld unit 26 is provided with a display and control interface 22 (e.g. touch screen display) for controlling the measurement/processing unit 24.

Figure 2:
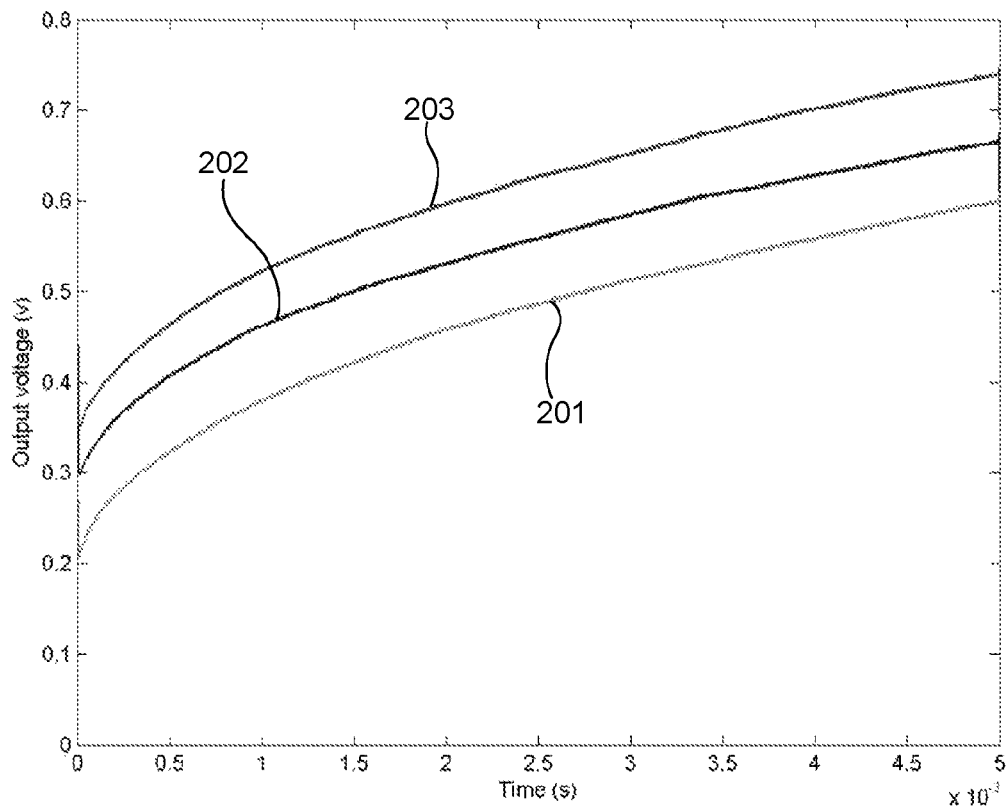
FIG. 2 is a graph showing responses of a platinum thin film resistive element to a heating pulse when in contact with three different liquids.

FIG. 2 depicts example data obtained using a resistive element 6 comprising a thin film formed from platinum mounted on a machinable glass-ceramic substrate 5. The entity being sensed comprised a liquid. The vertical axis shows an output voltage from the resistive element 6 during application of a heating pulse 10 of constant electrical current (corresponding to 5V through a resistance of about 50 Ohms) to the resistive element 6. The vertical axis is proportional to the resistance of the resistive element 6, which in turn varies in a predetermined way as a function of the temperature of the resistive element 6. The horizontal axis measures time from 0 to 5 ms, which in this case corresponds to the duration of one heating pulse 10. The resistive element 6 was mounted flush against the substrate 5, so in this particular example approximately 50% of the surface area of the platinum film was exposed to the liquid being tested. The three curves shown in FIG. 2 illustrate respectively how the resistance (and thus temperature) of the resistive element 6 changed as a function of time during application of the heating pulse 10 when the resistive element 6 was in contact with each of three different formulations of liquid. Curve 201 corresponds to the case where the liquid comprised oil only. Curve 202 corresponds to the case where the liquid comprised a mixture of oil and water. Curve 203 corresponds to the case where the liquid comprised a mixture of oil and small copper particles. As can be seen, the heights of the three curves 201-203 are markedly different despite the fact that identical heating pulses 10 were applied in each case. The differences between the three curves 201-203 arise because of the different heat transfer characteristics of the liquids in each case.

The measurement system 8 may be configured to deliver power to the resistive element 6 by driving an electrical current through the resistive element 6 at the same time as measuring the resistance of the resistive element 6 (which depends on the temperature of the resistive element 6).

The change in resistance/temperature of the resistive element 6 caused by the heating will depend on the ability of material in contact with the resistive element 6 to carry the heat away and therefore on the heat transfer characteristics of the material. If the heat transfer characteristics of the material are different relative to a reference, for example changed due to a change in composition, this will be detectable as a deviation in the relationship between the amount of heat supplied and the resulting change in resistance/temperature of the resistive element 6 from what would be expected for the reference. Example circuitry for a measurement system 8 configured to perform such measurements is shown in FIG. 4.

Figure 4:
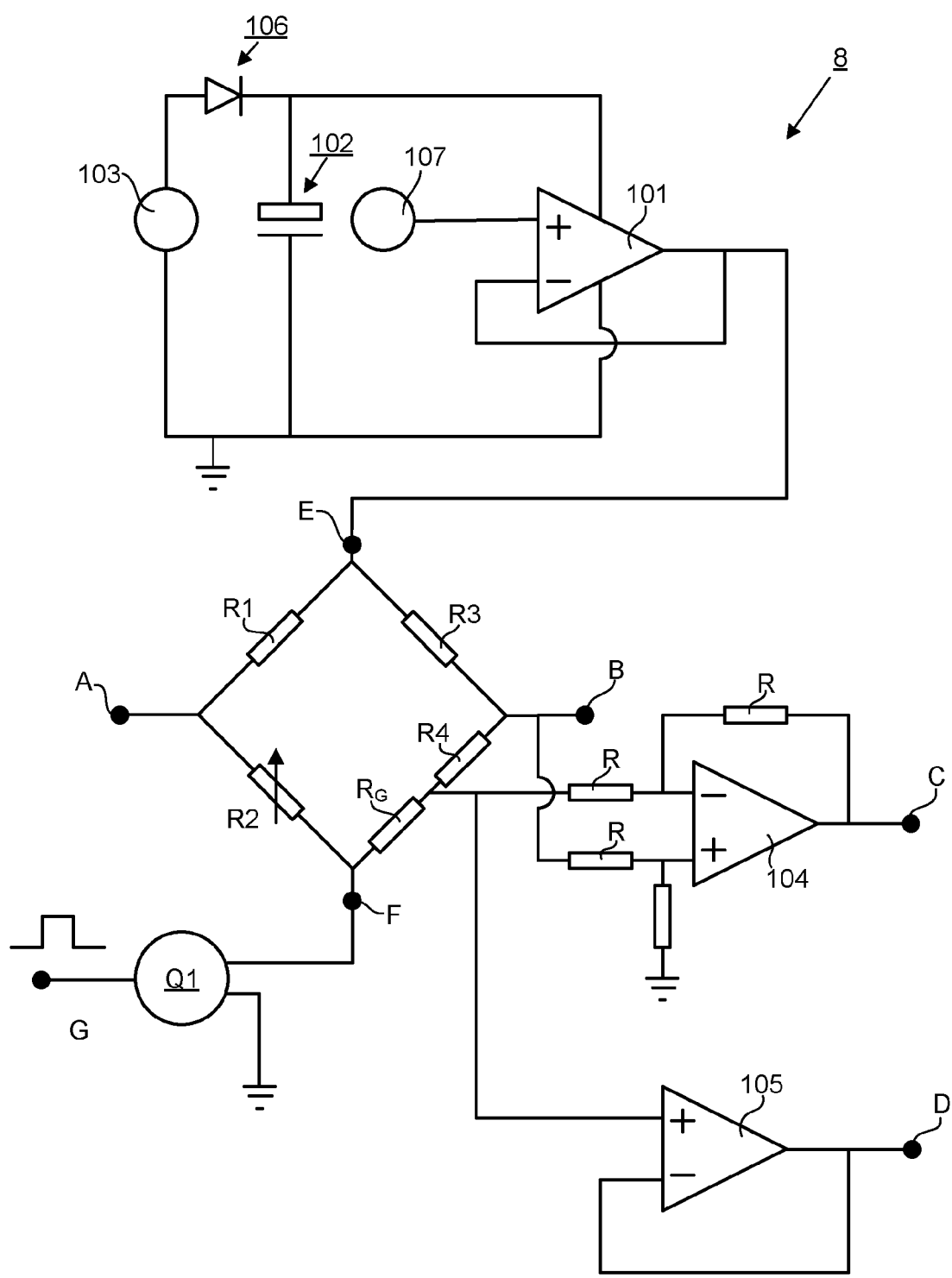
FIG. 4 depicts example circuitry for implementing a measurement system of a sensing apparatus.

The following elements are shown in FIG. 4:
101 Power amplifier (e.g. about 10A RATED)
102 Charge store (e.g. about 40,000 µF)
103 Power supply (e.g. about 30V DC)
104 Differential amplifier for I
105 Buffer amplifier for V
R1+R2 Bridge balance
R3+$R_G$ Active bridge half
Q1 Power switch (e.g. fast, low resistance MOSFET)
C Output of current I
D Output of voltage V
E High side of bridge
F Low side of bridge
G Signal pulse control
R4 Current sense shunt (resistance) (e.g. 20 mΩ)

A+B Diagnostic differential signal outputs for development

106 Diode rectifier

107 Voltage reference

A voltage generated by voltage supply 103 is fed through a rectifier diode 106 to charge a high capacity storage 102. The storage 102 provides a high current power source to the power amplifier 101. A voltage reference 107 sets a high side voltage presented at E.

A bridge is created between the points A, E, B and F. In an example, R3 and $R_G$ are about 1.0 Ohms, and R1 and R2 are about 470 Ohms. A power switch device Q1 is provided to rapidly bring point F to ground under a signal pulse at G. The circuit enables a steady bridge voltage to be maintained without demanding a high gain bandwidth from the power amplifier 101. The power amplifier 101 needs only to maintain a DC level. High energy pulses of precise timing are made possible using a fast MOSFET power switch for Q1 at the low side of the bridge.

When the bridge is energised the differential voltage points (A & B) will provide a voltage corresponding to the Ohmic resistance change of the gauge element $R_G$ (e.g. the resistive element 6). The other resistors in the bridge are chosen to have a very low parts-per-million (ppm) change in resistance with temperature. Therefore observed bridge voltages are only a function of the gauge $R_G$.

For precise measurements of heat transfer to the resistive element 6, and from the resistive element 6 to material in contact with the resistive element 6, it is desirable to measure the voltage V and current I across the resistive element 6. The current is determined from the output of the circuit at C. The voltage is determined from the output of the circuit at D. Thus the energy input and the corresponding rise in temperature can be determined and the heat transfer function to the material in contact with the resistive element 6 can be computed. The total energy and energy rate can be controlled by varying the reference voltage 107 and the pulse duration at G.

The circuit allows a modest power source to store energy to deliver very high energy density pulses. Electronic controls may be provided to activate the power level and pulses duration whilst reading the voltage signals at C and D. The electronic controls may be provided by the measurement system 8 or processing unit 18, or both.

In an embodiment, fast ADC to storage in computer memory is employed leaving time to compute the heat transfer data from which quantitative measurements can be performed and compared to calibrated lookup tables to provide qualitative assessments of the composition of the entity being tested. This functionality may for example be performed in the processing unit 18.

Figure 3:
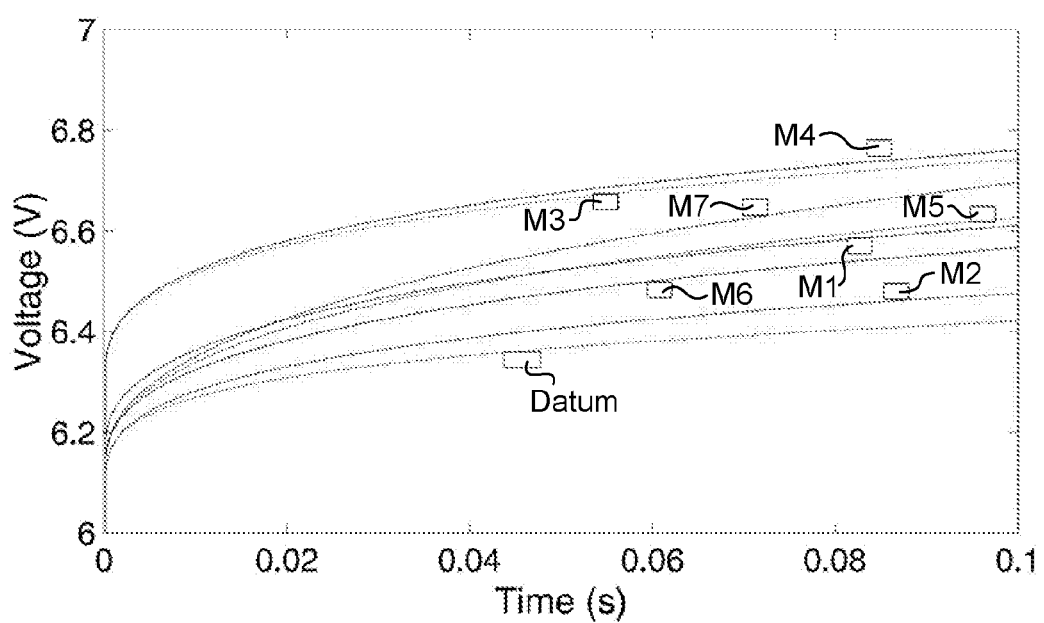
FIG. 3 is a graph showing changes of resistance with time during heating of a resistive element in contact with different solid samples.

FIG. 3 show representative data showing the result of applying a heating pulse 10 to a resistive element 6 comprising a thin film encapsulated by a support material when the material being sensed comprises a variety of different solid objects. The curve for a reference solid object is labelled "Datum". Curves for other solid objects of nominally identical composition are marked M1-M7. In this particular example the solid objects are samples of fine grained rock. The vertical axis shows an output voltage from the resistive element 6 during application of the heating pulse. The vertical axis is proportional to the resistance of the resistive element 6, which in turn varies in a predetermined way as a function of the temperature of the resistive element 6. The horizontal axis measures a time interval spanning application of one heating pulse 10. FIG. 3 demonstrates that even for solid samples of nominally identical composition, small changes in actual composition lead to detectable differences in the response of the resistive element 6 to a heating pulse, thereby enabling detection of deviations of the samples from a reference ("Datum").

In embodiments where the resistive element 6 is separated from the material being sensed by a support material or other material, the duration 14 of the heating pulse 10 should be long enough for the heat generated to pass significantly into the material being sensed. If the duration 14 is too short the heating will only sample the support material or other material and provide information about the thermal properties of the support material or other material, which may not be of interest. This is why the pulse length (0.1 s) in the example of FIG. 3 (where the resistive element 6 is encapsulated by a support material) is much longer than the pulse lengths used in the example of FIG. 2. The fact that the heat generated at the resistive element 6 samples different layers sequentially can be used to obtain information about different layers of a sample in a single measurement. Variation of the resistance of the resistive element 6 in different time windows can be attributed to different layers (earlier time windows corresponding to shallower layers than deeper time windows). This provides a convenient way of obtaining information about the thermal properties of a sample selectively at different depths within the sample.

Figure 6:
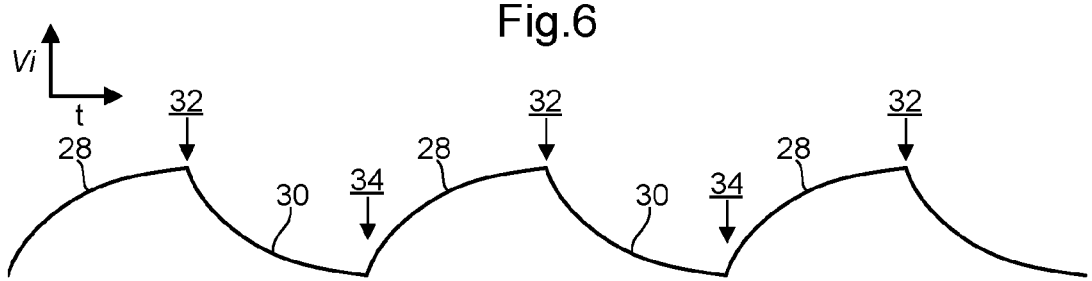
FIG. 6 depicts an ideal electrical response Vi of a resistive element to the plurality of heating pulses of FIG. 5.

FIG. 6 depicts variation of a measured signal Vi proportional to a resistance of the resistive element 6 (i.e. an electrical response of the resistive element 6) as a function of time, in the case where the plurality of heating pulses 10 depicted in FIG. 5 are applied to the resistive element 6, and in which there is no long term variation (drift) in the temperature of the resistive element 6. Vi increases in each heating pulse 10 according to a rising curve 28 and reaches a maximum value at point 32 at the end of the heating pulse 10. Vi then falls according to a falling curve 30 in the period 12 between each pair of heating pulses 10. In this ideal scenario, Vi reaches the same value at point 32 at the end of each and every heating pulse 10 for which the composition of the entity being sensed is identical and falls back to the same value at the end of each period 12 between heating pulses 10 at point 34.

Figure 7:
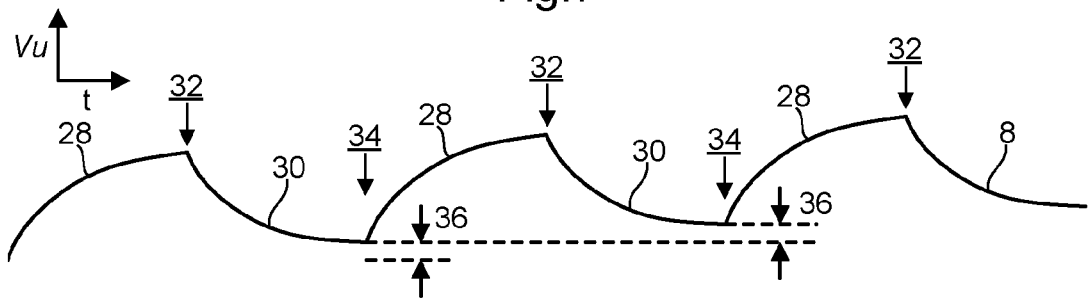
FIG. 7 depicts an uncompensated electrical response Vu of a resistive element in the presence of temperature drift.

In the ideal scenario of FIG. 6, an accurate measure of the compositional information of the entity can be obtained based on Vi at each of the points 32 (for example). In many applications, however, drifts in the temperature of the entity being sensed will cause drifts in the measured signal at the points 32 over time (or at other reference points), leading to errors in the determination of compositional information. Furthermore, drifts in the temperature of the entity being sensed will also affect properties of the entity relevant to thermal behaviour (e.g. thermal conductively, heat capacity or density) without there being any change in the composition of the entity being sensed, further contributing to errors in the determination of compositional information. The effect is depicted schematically in FIG. 7 for a steady upward drift in the temperature of the entity being sensed. The variation of the measured signal Vu shown in FIG. 7 is similar to that depicted in FIG. 6 except that the signal shifts gradually upwards, resulting in an overall offset 36 between each heating pulse and the next heating pulse. Vu at the end point 34 of each falling curve 30, for example, is offset by offset 36 relative to Vu at the end point 34 of the preceding falling curve 30. Vu at the end point 32 of each rising curve 28 is also offset by the same amount.

According to an embodiment, as depicted in FIG. 1, the measurement system 8 is configured to at least partially correct the behaviour described above with reference to FIG.

Figure 8:
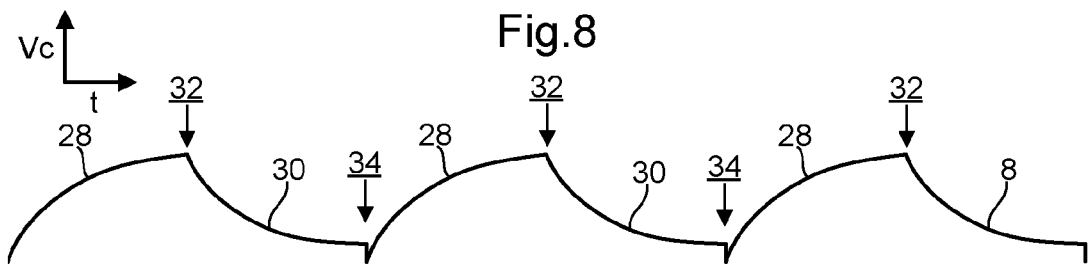
FIG. 8 depicts a compensated electrical response Vc of a resistive element in the presence of temperature drift.

7, thereby improving the accuracy and/or sensitivity with which compositional information can be sensed without requiring complex analysis of the output signal. In an embodiment, the measurement system 8 generates an output signal Vc using the measured electrical response of the resistive element (e.g. using an uncompensated measured voltage across the resistive element 6, such as the voltage Vu shown in FIG. 7) and progressively offsets the output signal to compensate for changes in the average temperature of the resistive element 6. An example compensated output signal Vc corresponding to the uncompensated measured voltage Vu of FIG. 7 is depicted in FIG. 8. The progressive offsetting is such that, in the event of an average temperature of the resistive element 6 (e.g. a mean average over the duration of each heating pulse 10) changing between different heating pulses 10 (as it does in the example of FIG. 7) a variance over the plurality of heating pulses 10 of a value of the output signal Vc at a predetermined common reference point (e.g. at the start) of each heating pulse 10 is reduced.

In an embodiment, the offsetting of the output signal Vc comprises applying an individual offset 36 to each portion of the output signal Vc corresponding to one heating pulse 10. In the example of FIG. 8, each such portion would comprise one of the rising curves 28. In the example of FIG. 8 an individual offset 36 is applied at the start of each heating pulse at point 34.

In the particular example of FIG. 8, the offsetting results in the variance of the output signal Vc at the start of each heating pulse 10 being zero, but it will be appreciated that incomplete compensation would also be a useful improvement over the situation depicted in FIG. 7.

In an embodiment, the individual offset for each portion of the output signal Vc corresponding to one heating pulse 10 is derived using a portion of the output signal Vc corresponding to a preceding heating pulse 10 or a period 12 directly before the preceding heating pulse in which no heating pulse is being applied. This may be achieved for example by deriving the individual offset based on a difference between the output signal Vc at a first predetermined point 34 in the heating pulse 10 or in a period 12 between the heating pulse 10 and the heating pulse 10 directly before the heating pulse 10 and the output signal at the same first predetermined point 34 in the preceding heating pulse 10 or in the period directly before the preceding heating pulse 10 in which no heating pulse is being applied. The reference preceding heating pulse may be the same heating pulse (e.g. a first heating pulse that is applied during a given measurement session) for a plurality of the individual offsets. This helps to minimize errors by reducing reliance on the accuracy of the offsetting process itself. Alternatively, the reference preceding pulse may be the heating pulse directly before the heating pulse for which the individual offset is being derived.

In an embodiment, the first predetermined point 34 is within 10% of the duration of the heating pulse 10 before the start of the heating pulse 10, optionally within 5%, optionally within 1%. In the particular example of FIG. 8, the first predetermined point 34 is substantially at the start of the heating pulse 10. In an embodiment, hardware within the measurement system 8 processes the output signal Vc at the start 34 of each heating pulse 10 to subtract from the output signal Vc a difference between the output signal Vc and the output signal Vc at the corresponding point 34 in the immediately preceding heating pulse 10 (or in a common reference, for example, first, preceding heating pulse 10). In the situation of FIGS. 7 and 8, this would result in the output signal Vc being offset downwards by the offset 36 shown in FIG. 7 at the start 34 of each heating pulse 10.

In an embodiment, as depicted in FIG. 1, the apparatus 2 further comprises a processing unit 18. The processing unit 18 processes the output signal Vc to determine information about either or both of the composition (e.g. chemical and/or structural composition) and state (e.g. pressure) of the entity being sensed. The compositional information may be determined for example based on the influence of the thermal product of a portion of the entity being sensed on the measured electrical response of the resistive element 6 to the heating pulses 10. In embodiments in which an individual offset for each portion of the output signal Vc corresponding to one heating pulse 10 is derived based on a difference between the output signal Vc at a first predetermined point 34 in the heating pulse 10 and the output signal Vc at the same first predetermined point 34 in a preceding heating pulse 10, the processing of the output signal Vc may use a value of the output signal Vc at a second predetermined point 32 in each heating pulse 10, the second predetermined point 32 being after the first predetermined point 34. The second predetermined point 32 may be within 10% of the duration of a heating pulse 10 before the end of the heating pulse 10, optionally within 5%, optionally within 1%, optionally substantially at the end of the heating pulse 10. In the particular example of FIG. 8, the second predetermined point 32 is substantially at the end of the heating pulse 10 (i.e. values of Vc corresponding to the end points 32 of the heating pulses 10 are used to determine compositional information about the entity).

In an embodiment the offsetting is applied in real time. In an embodiment, this involves generating the individual offset for each portion of the output signal Vc corresponding to one heating pulse 10 while the heating pulse 10 is being applied to the resistive element 6. Performing the compensation in real time increases the speed at which compositional information can be made available and avoids the need to store large amounts of data for later analysis and/or correction by a computer for example. In an embodiment, the offsetting of the output signal Vc is implemented exclusively in hardware (rather than firmware or software). Due to the limited computational complexity of the offsetting process, this can be achieved straightforwardly in a number of ways which would be apparent to the skilled person.

In an embodiment, the processing unit 18 is configured to process a history of the offsetting to determine a variation of the average temperature of the resistive element 6 over the plurality of heating pulses 10. The processing unit 18 can then be configured to use the determined variation of the average temperature to improve the determination of the information (e.g. chemical or structural composition) about the entity by taking account of temperature induced changes in one or more of the density, heat capacity and thermal conductivity of a portion of the entity being sensed by the heating pulses 10.

In an embodiment, the processing unit 18 derives a pressure of the entity being sensed in the case where the entity has a constant composition (which may or may not be a known composition). This provides a convenient and robust way of measuring pressure in a wide variety of environments. High accuracy can be achieved even when there are significant temperature fluctuations because the temperature of the entity being sensed is intrinsically part of the measurement process (and may be output together with the pressure). The processing unit 18 uses the determined variation of the average temperature (from the history of offsetting) to deduce a temperature of the fluid. The deduced temperature of the fluid is then used to obtain information about the heat capacity and thermal conductivity of the fluid. The information may comprise individual values for the heat capacity and the thermal conductivity or values for a combination (e.g. product or square root of the product) of the heat capacity and thermal conductivity. The information about the heat capacity and thermal conductivity may be obtained from predetermined information (e.g. calibration data) about the expected temperature dependence of the heat capacity and thermal conductivity of the fluid (either individually or in combination). In the case where the composition of the entity being sensed is known, the predetermined information may be obtained from textbooks. Alternatively or additionally, calibration measurements may be performed, for example by measuring the thermal product at a plurality of different temperatures and constant pressure (and therefore density). A calibration mapping temperature to the product of heat capacity and thermal conductivity can thus be obtained. The obtained information about the heat capacity and the thermal conductivity is then used to obtain the pressure using heat transfer characteristics derived from the electrical response of the resistive element 6 to the heating pulses 10. For example, the electrical response of the resistive element 6 may be used to determine the thermal product $\sqrt{\rho c \kappa}$, which depends on density and the product of heat capacity and thermal conductivity. If thermal product and the product of heat capacity and thermal conductivity are known, then density can be derived. The pressure of the fluid can be derived from the density and the temperature (e.g. using the ideal gas law for an ideal gas).

Figure 9:
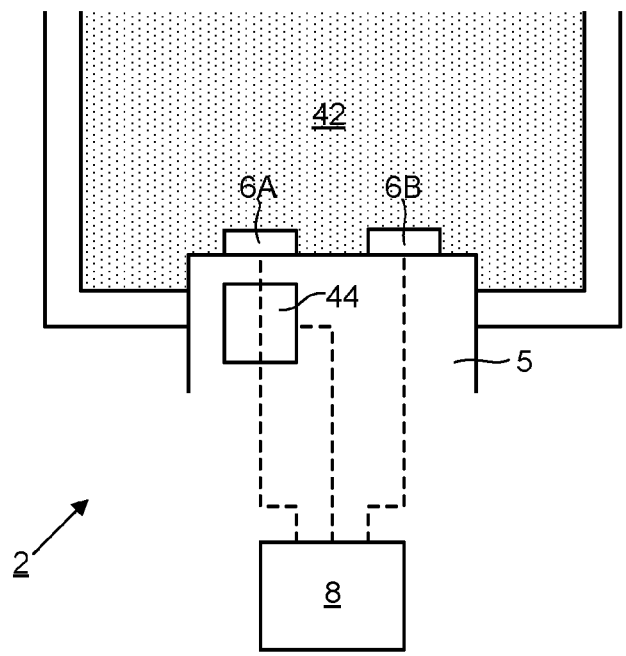
FIG. 9 schematically depicts a sensing apparatus comprising a first resistive element, a second resistive element, and a magnetic field applying unit.
Figure 10:
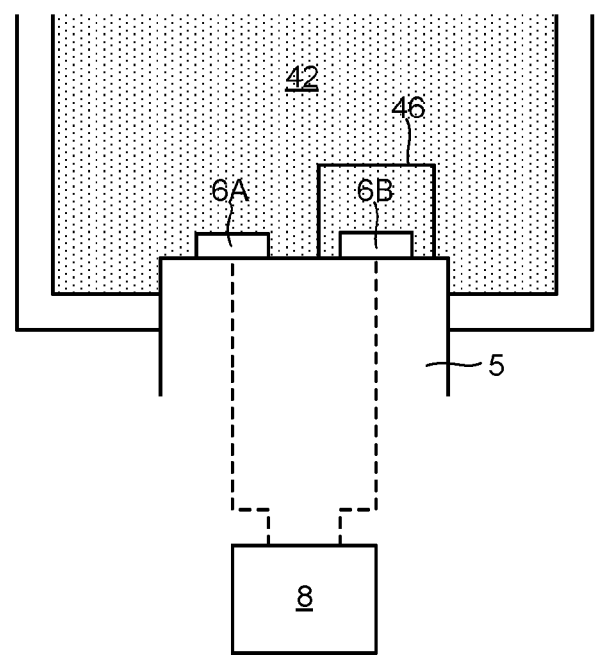
FIG. 10 schematically depicts a sensing apparatus comprising a first resistive element, a second resistive element, and a deposition inhibiting device.

In an embodiment, examples of which are depicted in FIGS. 9 and 10, the apparatus 2 comprises a plurality of the resistive elements 6. The plurality of resistive elements comprises a first resistive element 6A and a second resistive element 6B. The first resistive element 6A and the second resistive element 6B are brought into contact with an entity to be sensed. In an embodiment, the entity to be sensed comprises a fluid 42 to be sensed. Embodiments of this type are particularly applicable for sensing liquids, including liquids for lubricating or cooling machinery.

Each of the first resistive element 6A and the second resistive element 6B may be configured in any of the ways described above for the resistive element 6. In the examples shown in FIGS. 9 and 10, the first and second resistive elements 6A and 6B are mounted on a common substrate 5. In other embodiments, separate respective substrates are provided for the first and second resistive elements 6A and 6B. In an embodiment, the first resistive element is formed from the same material as the second resistive element. In an embodiment, the first resistive element has the same resistance as the second resistive element, optionally within an error margin of 20%, optionally within an error margin of 10%, optionally within an error margin of 5%, optionally within an error margin of 1%.

A measurement system 8 is provided that applies a first heating to the entity 42 via the first resistive element 6A and measures a first electrical response of the first resistive element 6A to the first heating. In an embodiment, the first heating comprises a plurality of heating pulses. In an embodiment a first output signal is generated by progressively offsetting the measured electrical response such that, in the event of an average temperature of the first resistive element 6A changing between different heating pulses due to a drift in the average temperature of a portion of the entity being sensed, a variance over the plurality of heating pulses of a value of the first output signal at a predetermined common reference point within each heating pulse is reduced, as described above with reference to the arrangement of FIG. 1. In other embodiments, no progressive offsetting is applied.

The measurement system 8 further applies a second heating to the entity 42 via the second resistive element 6B and measures a second electrical response of the second resistive element 6B to the second heating. In an embodiment, the second heating comprises a plurality of heating pulses. In an embodiment a second output signal is generated by progressively offsetting the measured electrical response such that, in the event of an average temperature of the second resistive element 6B changing between different heating pulses due to a drift in the average temperature of a portion of the entity being sensed, a variance over the plurality of heating pulses of a value of the second output signal at a predetermined common reference point within each heating pulse is reduced, as described above with reference to the arrangement of FIG. 1. In other embodiments, no progressive offsetting is applied.

In an embodiment, a heating profile of power delivered as a function of time is substantially the same for the first heating and the second heating.

Figure 11:
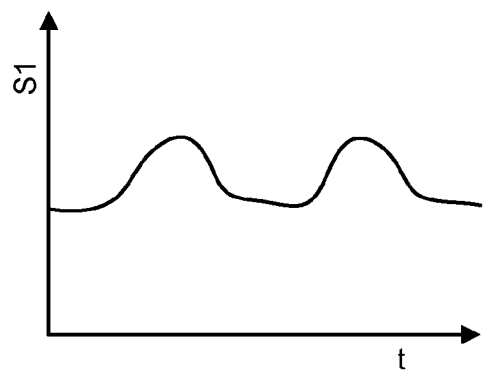
FIG. 11 is a graph schematically illustrating an example variation with time of a value S1 of an electrical response of a first resistive element at a predetermined point in a heating pulse.
Figure 12:
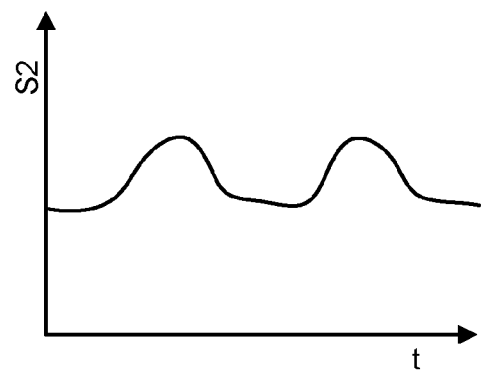
FIG. 12 is a graph schematically illustrating an example variation with time of a value S2 of an electrical response of a second resistive element at a predetermined point in a heating pulse.
Figure 13:
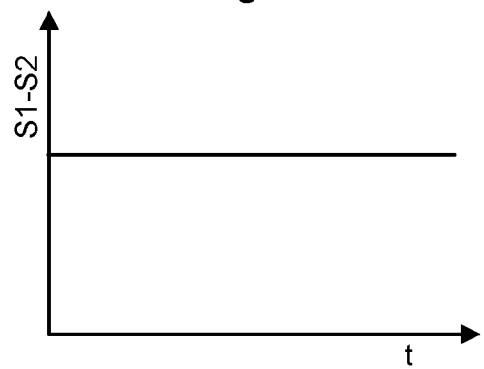
FIG. 13 is a graph schematically illustrating variation of the quantity S1-S2 for the S1 and S2 variations shown in FIGS. 11 and 12.

In the embodiments described above with reference to FIG. 1, drifts in temperature of the entity being sensed are compensated for by the progressive offsetting used when generating the output signal. In embodiments of the type depicted in FIGS. 9 and 10, drifts in temperature of the entity being sensed are compensated for instead (or additionally) by comparing the measured first electrical response and the measured second electrical response (e.g. by taking a difference between the measured first electrical response and the measured second electrical response). Because the first resistive element 6A and the second resistive element 6B are measuring the same entity at the same time, the first resistive element 6A and the second resistive element 6B are affected by temperature changes in the entity being sensed in a correlated (e.g. the same) way. This is depicted schematically in FIGS. 11 and 12, which respectively show variation with time of a value S1 and S2 representing a value (e.g. proportional to resistance) of the first and second electrical response at a predetermined point in a heating pulse (e.g. at the end of a heating pulse). As temperature of the entity (e.g. oil) varies (e.g. as an engine is turned on and off or a load on the engine changes), S1 and S2 vary in the same way. FIG. 13 plots a difference between S1 and S2 over the same period of time shown in FIGS. 11 and 12 in a case where there is a low level of contamination during the whole period. The curve is perfectly flat, showing that the first resistive element 6A and the second resistive element 6B output very similar measurements for the whole time period.

Where the entity being sensed is contaminated in a way which affects the first resistive element 6A differently from the second resistive element 6B, this can be detected with high sensitivity using the above-described approach of comparing the measured first electrical response with the measured second electrical response. For example, in a case where particulate contaminants are present in a liquid being sensed at a concentration which makes it likely that an amount of the particulates in contact with the first resistive element 6A will be different from an amount of the particulates in contact with the second resistive element 6B (e.g. one particle in contact with the first resistive element 6A and no particles in contact with the second resistive element 6B), the presence of the contamination will show up as a deviation from the uniform profile shown in FIG. 13.

In an embodiment, as depicted in FIG. 9, a magnetic field applying unit 44 (e.g. a permanent magnet or an electromagnet) is provided to apply a magnetic field to the entity 42 being sensed. The magnetic field is effective to attract magnetic contaminant particles (e.g. any particle that experiences a significant force in a magnetic field, such as a particle containing iron) towards the first resistive element 6A to a greater extent than towards the second resistive element 6B. This may be achieved for example by providing a magnetic field applying unit 44 comprising a permanent magnet or an electromagnet directly underneath the first resistive element 6A and not underneath the second resistive element 6B, as depicted in FIG. 9.

Using a permanent magnet for the magnetic field applying unit 44 can be implemented simply because it is not necessary to control a supply of power to the magnetic field applying unit 44. This approach may be particularly suitable where it is desired to apply the magnetic field for a relatively long time. Using an electromagnet for the magnetic field applying unit 44 provides more flexibility because the magnetic field can be switched on and off and/or varied in size as desired. This may be useful for example where a flowing liquid is being sensed. Particles will be attracted towards the first resistive element 6A when the electromagnet is energized and will be driven off the first resistive element 6A by the flow of liquid when the electromagnet is not energized. Independent measurements of contamination can thus be made at multiple different times with minimal cross-talk between different measurements (e.g. due to contaminants from a previous measurement still be present during a later measurement).

Figure 16:
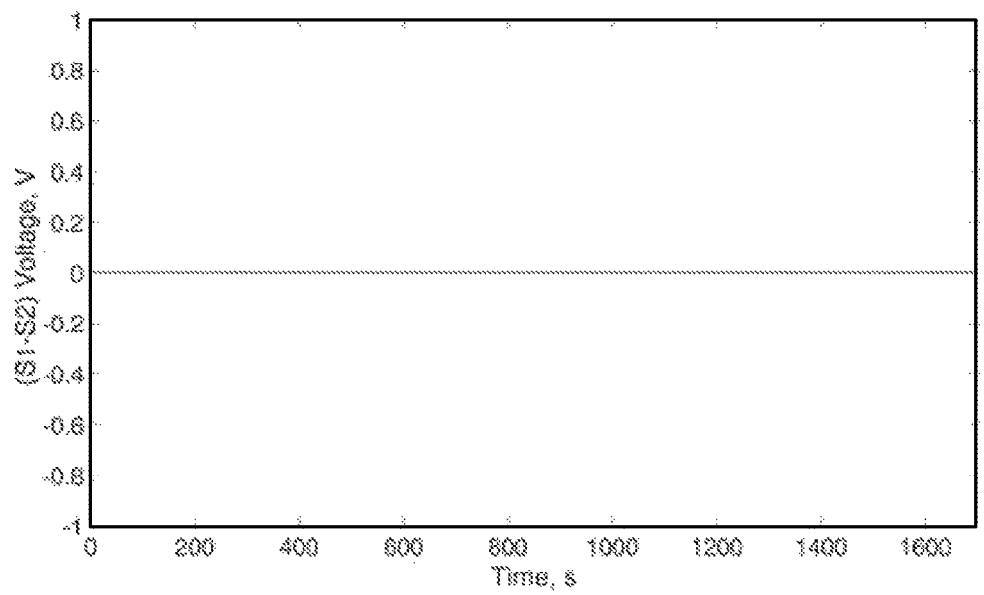
FIG. 16 is a graph showing variation of the quantity S1-S2 for the S2 and S1 variations shown in FIGS. 14 and 15.
Figure 17:
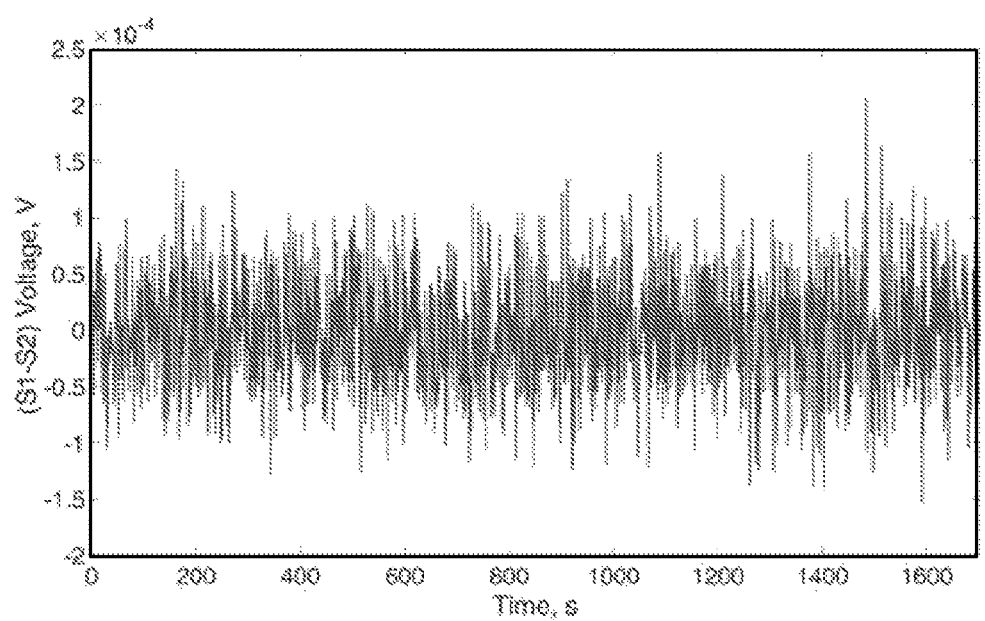
FIG. 17 is a graph showing the variation of S1-S2 of FIG. 16 with an expanded vertical scale.
Figure 18:
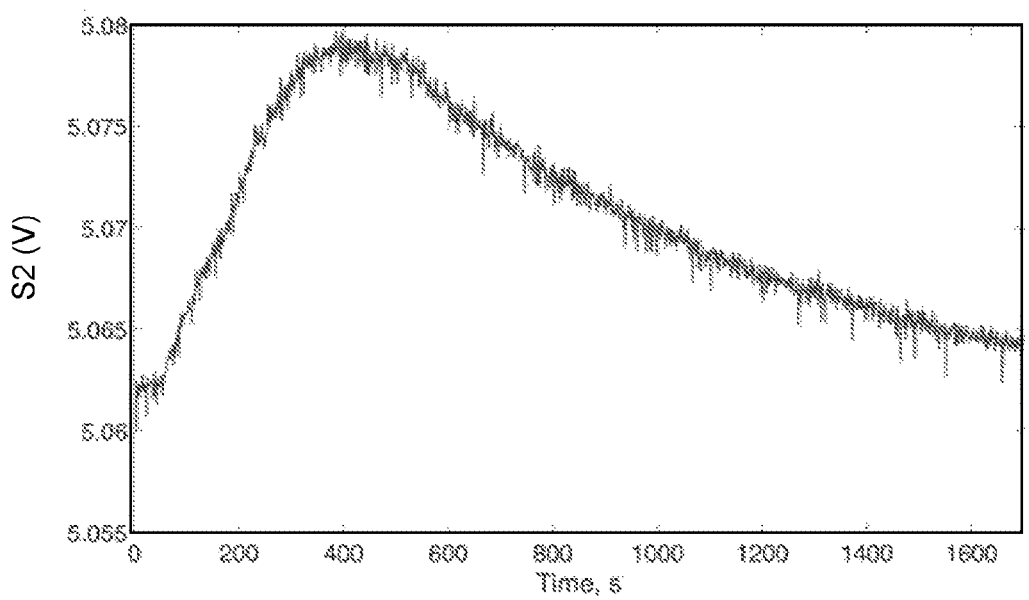
FIG. 18 is a graph showing measurements of S2 against time using an embodiment of the type depicted in FIG. 9 in a case where contamination is present during the time period covered.
Figure 19:
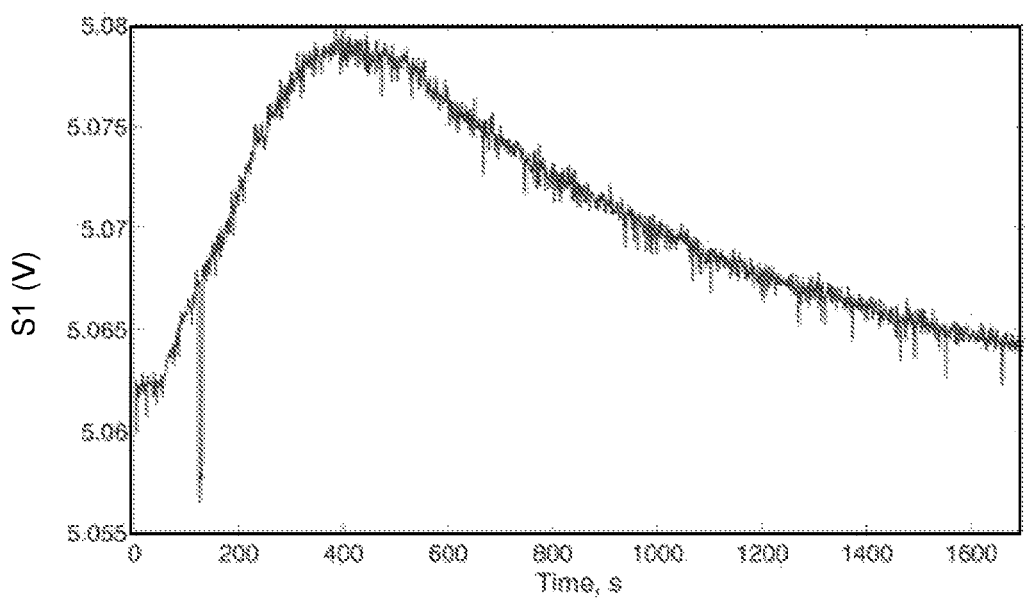
FIG. 19 is a graph showing measurements of S1 against time using the same embodiment as was used to generate the data of FIG. 18 during the same time period.
Figure 20:
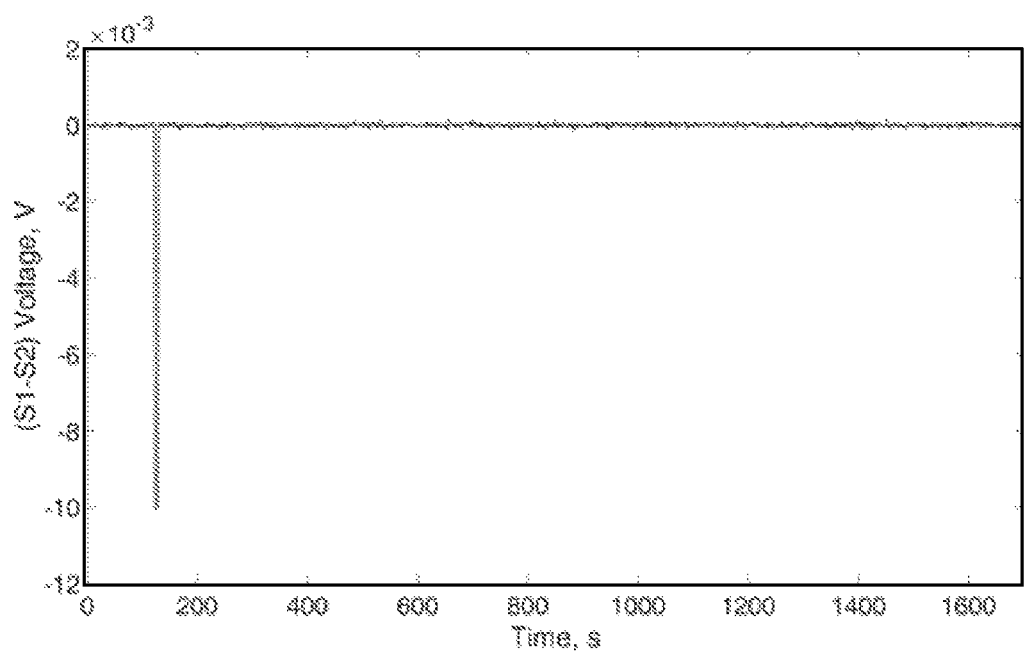
FIG. 20 is a graph showing variation of the quantity S1-S2 for the S2 and S1 variations shown in FIGS. 18 and 19.

FIGS. 14-20 show measurements made using an apparatus 2 of the type shown in FIG. 9, in which a magnetic field applying unit 44 is provided in the form of a permanent magnet. FIGS. 14-17 show measurement made when a liquid being sensed has no detectable contamination for the whole sensing time period. FIGS. 18-20 show measurements where a contamination event is present in the sensing period.

Figure 14:
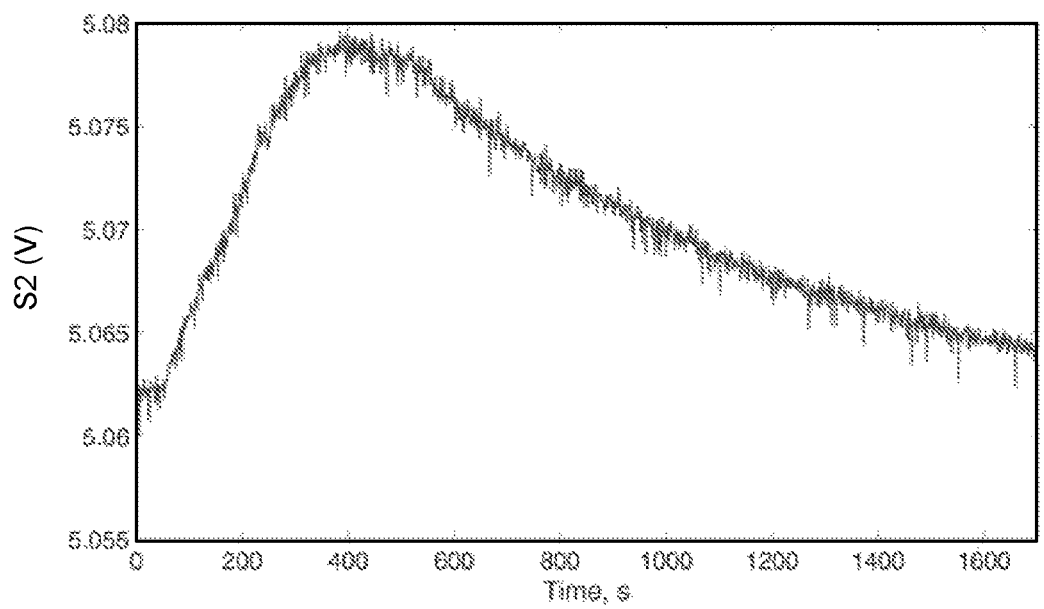
FIG. 14 is a graph showing measurements of S2 against time using an embodiment of the type depicted in FIG. 9.

FIG. 14 depicts measurements of S2 for the second resistive element 6B in a measurement of the type described above with reference to FIG. 12.

Figure 15:
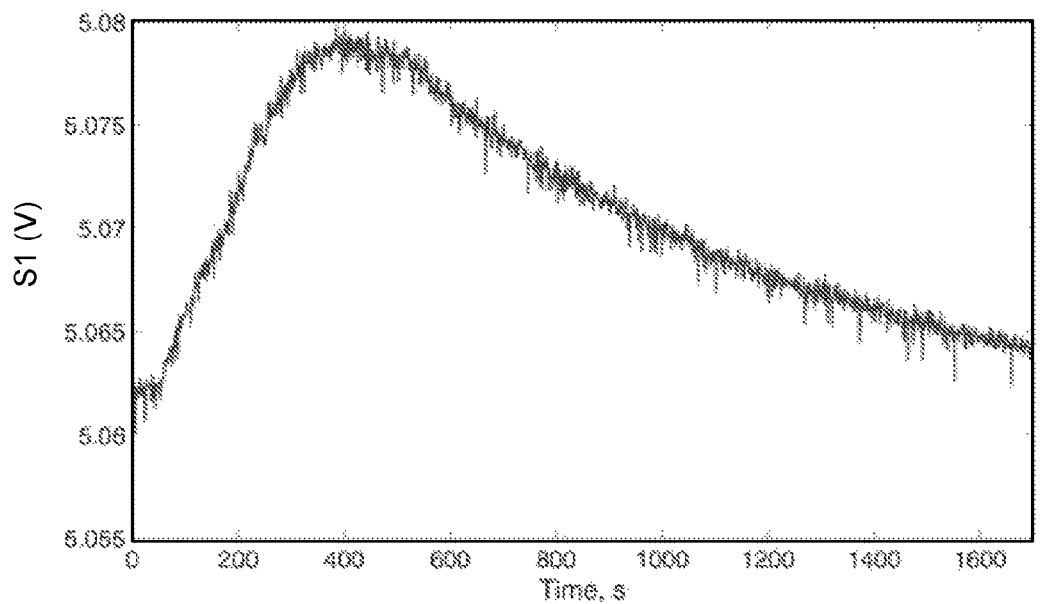
FIG. 15 is a graph showing measurements of S1 against time using the same embodiment as was used to generate the data of FIG. 14 during the same time period.

FIG. 15 depicts measurements of S1 for the first resistive element 6A in a measurement of the type described above with reference to FIG. 11.

The graphs of FIGS. 14 and 15 appear qualitatively similar and this is confirmed by the flat curve of S1-S2 shown in FIGS. 16 and 17.

FIGS. 18 and 19 correspond respectively to FIGS. 14 and 15 but show the effect of a contamination event at around 110 s. The event shows up only in FIG. 19 (corresponding to measurements obtained using the first resistive element 6A that is nearest to the magnetic field applying unit 44). FIG. 20 shows S1-S2 and the contamination event is shown very clearly as a deviation from the nominally flat profile.

FIG. 10 depicts a variation on the embodiment of FIG. 9 in which a deposition inhibiting device 46 inhibits deposition of contaminant particles on the second resistive element 6B relative to the first resistive element 6A. In an embodiment, the deposition inhibiting device 46 comprises a filter, such as a permeable membrane. Thus, a liquid being sensed can move relatively freely through the deposition inhibiting device but contaminants in the liquid cannot. The effect of the deposition inhibiting device 46 is very similar to the effect of the magnetic field applying unit 44: namely, to encourage contaminants to move preferentially towards the first resistive element and thereby create a signal in the differential measurement S1-S2 when contamination is present.

The use of the first resistive element 6A and second resistive element 6B in the manner described above effectively provides an extra channel of information. An output from the first resistive element 6A or the second resistive element 6B individually, optionally compensated for temperature drift using the progressive offsetting described above, allows information to be obtained about a state of an entity being sensed other than a level of contamination (particularly particulate contamination), including for example a level of degradation or chemical breakdown (e.g. oxidation). Using a comparison between measurements obtained using both of the first resistive element 6A and the second resistive element 6B allows information about contamination to be detected. Thus, degradation and contamination can be measured separately from each other using the same group of resistive elements 6A, 6B.

The invention claimed is:

1. A sensing apparatus, comprising:
 a probe comprising a resistive element configured to be brought into thermal contact with an entity to be sensed; and
 a measurement system configured to apply a plurality of heating pulses to the resistive element by driving an electrical current through the resistive element and to measure an electrical response of the resistive element to the heating pulses in order to determine information about either or both of the composition and state of the entity being sensed, wherein
 the measurement system is configured to generate an output signal using the measured electrical response, wherein the output signal is generated by progressively offsetting the measured electrical response such that, in the event of an average temperature of the resistive element changing between different heating pulses due to a drift in the average temperature of a portion of the entity being sensed, a variance over the plurality of heating pulses of a value of the output signal at a predetermined common reference point within each heating pulse is reduced.

2. The apparatus of claim 1, wherein the offsetting of the measured electrical response is implemented exclusively in hardware.

3. The apparatus of claim 1, wherein the plurality of heating pulses each have the same duration and are regularly spaced apart from each other.

4. The apparatus of claim 3, wherein the duration of each heating pulse is equal to or less than the separation between the pulses.

5. The apparatus of claim 1, wherein the resistive element is mounted on a substrate in such a way that at least 10% of the surface area of the resistive element is in contact with the substrate.

6. The apparatus of claim 5, wherein the resistive element is a thin film resistive element having a first surface configured to face towards the entity being sensed and a second surface facing towards the substrate.

7. The apparatus of claim 1, wherein:
 the probe comprises a plurality of the resistive elements, including a first resistive element and a second resistive element;
 the first resistive element and the second resistive element are configured to be brought simultaneously into contact with the entity being sensed;
 the measurement system is configured to generate a plurality of the output signals, including a first output signal generated by applying the plurality of heating pulses to the first resistive element and a second output signal generated by applying the plurality of heating pulses to the second resistive element; and the apparatus is configured to detect a level of contamination in the entity being sensed by comparing the first output signal to the second output signal.

8. The apparatus of claim 7, wherein the apparatus is further configured to determine a state of the entity being sensed other than a level of contamination of the entity being sensed based on the measured electrical response of the first resistive element or the second resistive element individually.

9. The apparatus of claim 1, further comprising a processing unit configured to process the output signal to determine the information about either or both of the composition and state of the entity being sensed.

10. The apparatus of claim 9, wherein the processing unit is configured to process a history of the offsetting to determine a variation of the average temperature of the resistive element over the plurality of heating pulses and thereby a variation in the average temperature of the portion of the entity being sensed.

11. The apparatus of claim 10, wherein the processing unit is configured to use the determined variation of the average temperature of the portion of the entity being sensed to improve the determination of the information about the entity being sensed, by taking account of temperature induced changes in one or more of the density, heat capacity and thermal conductivity of the portion of the entity being sensed.

12. The apparatus of claim 10, wherein the entity being sensed comprises a fluid and the processing unit is configured to derive a pressure of the entity being sensed by using the determined variation of the average temperature of the portion of the entity being sensed to obtain information about the heat capacity and thermal conductivity of the entity being sensed from predetermined information about an expected temperature dependence of the heat capacity and a thermal conductivity of the entity being sensed, and using the obtained information about the heat capacity and the thermal conductivity to obtain the pressure using heat transfer characteristics obtained from the electrical response of the resistive element to the heating pulses.

13. The apparatus of claim 1, wherein the offsetting of the measured electrical response comprises applying an individual offset to each portion of the output signal corresponding to one heating pulse.

14. The apparatus of claim 13, wherein the individual offset to for each portion of the output signal corresponding to one heating pulse is applied while the heating pulse is being applied to the resistive element.

15. The apparatus of claim 13, wherein the individual offset to for each portion of the output signal corresponding to one heating pulse is derived using a portion of the output signal corresponding to a preceding heating pulse or a period directly before the preceding heating pulse in which no heating pulse is being applied.

16. The apparatus of claim 15, wherein the preceding heating pulse is the same heating pulse for a plurality of the individual offsets.

17. The apparatus of claim 15, wherein the preceding heating pulse is the heating pulse directly before the heating pulse for which the individual offset is being derived.

18. The apparatus of claim 15, wherein the individual offset to for each portion of the output signal corresponding to one heating pulse is derived based on a difference between the output signal at a first predetermined point in the heating pulse or in a period between the heating pulse and the heating pulse directly before the heating pulse and the output signal at the same first predetermined point in the preceding heating pulse or in the period directly before the preceding heating pulse in which no heating pulse is being applied.

19. The apparatus of claim 18, wherein the first predetermined point is within 10% of the duration of the preceding heating pulse before the start of the heating pulse.

20. The apparatus of claim 18, wherein the apparatus further comprises a processing unit configured to process the output signal to determine the information about either or both of the composition and state of the entity being sensed, wherein the processing of the output signal uses a value of the output signal at a second predetermined point in each heating pulse, the second predetermined point being after the first predetermined point.

21. A sensing method, comprising:
bringing a resistive element into thermal contact with an entity to be sensed; and
determining information about either or both of the composition and state of the entity being sensed by applying a plurality of heating pulses to the resistive element by driving an electrical current through the resistive element and measuring an electrical response of the resistive element to the heating pulses, wherein
an output signal is generated using the measured electrical response, and the output signal is generated by progressively offsetting the measured electrical response such that, in the event of an average temperature of the resistive element changing between different heating pulses due to a drift in the average temperature of a portion of the entity being sensed, a variance over the plurality of heating pulses of a value of the output signal at a predetermined common reference point within each heating pulse is reduced.

22. The method of claim 21, wherein:
a plurality of the resistive elements are brought simultaneously into thermal contact with the entity being sensed, including a first resistive element and a second resistive element;
a plurality of the output signals are generated, including a first output signal generated by applying the plurality of heating pulses to the first resistive element and a second output signal generated by applying the plurality of heating pulses to the second resistive element; and
the method further comprises detecting a level of contamination in the entity being sensed by comparing the first output signal to the second output signal.

* * * * *